May 10, 1960    B. C. VON PLATEN ET AL    2,936,154
WATER-COOK WITH VALVE SEATING AND VALVE BODY
Filed Sept. 9, 1957

INVENTOR.
Baltzar C. Von Platen
BY Finn Lennart Jonsson
Eric Y............
Attorney

United States Patent Office 2,936,154
Patented May 10, 1960

2,936,154

WATER-COOK WITH VALVE SEATING AND VALVE BODY

Baltzar Carl von Platen and Finn Lennart Jonsson, Stockholm, Sweden

Application September 9, 1957, Serial No. 682,920

6 Claims. (Cl. 251—332)

The present invention relates to a valve head for faucets and the like and more particularly to a valve seat arrangement in which a semi-solid material is distorted by the closing movement of the valve member against a stationary valve seat to effectuate a fluid tight seal between the valve member and the valve seat.

Among the several objections to conventional faucet valves are their tendency to leak or drip after a period of use regardless of the force employed in turning the valve to the closed position. This leakage or dripping results from wear of the valve member, the valve washer and the valve seating surface. The wear on the aforementioned sealing elements is increased by the tendency to exert excessive force in turning the valve stem to the closed position in an attempt to correct the annoying drip.

It is therefore among the objects of the invention to provide a highly wear resistant faucet valve which can be opened and closed to provide a fluid tight seal with a minimum of manual effort.

Another object is to provide a drip proof valve seat.

A further object is to provide a valve seat which will eliminate the replacement of faucet washers, the refacing of the valve seats and reduce the service cost.

Still a further object is to provide a valve seat which makes possible a tighter seating with lower pressure on the valve stem and seating members.

These and other objects inherent in the invention may be attained by a controlled distortion of a semi-solid packing material, such as neoprene, or rubber and the like, partially confined within a ring shaped member associated with the valve stem, and which packing has countersunk therein a core of solid wear resistant material for closing the fluid inlet and to provide a tight seal against the surface of the valve seat under the pressure exerted by the resilient packing and produced by the closing operation of the valve stem.

The invention will be more clearly understood from the following detailed specification and accompanying drawings which describe and illustrate by way of example a preferred embodiment together with possible modifications.

Figure 1:
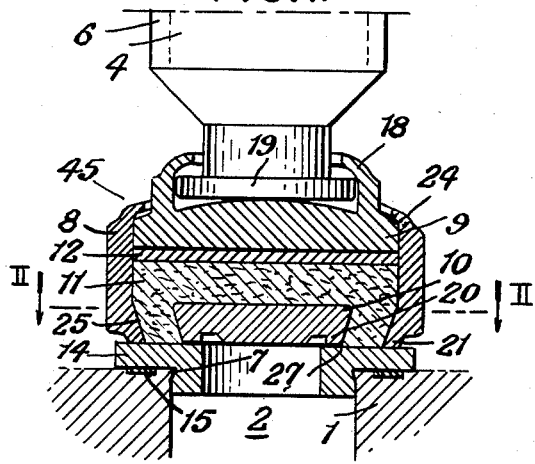
Fig. 1 is an axial partial cross section of a valve seat arrangement according to the invention.
Figure 2:
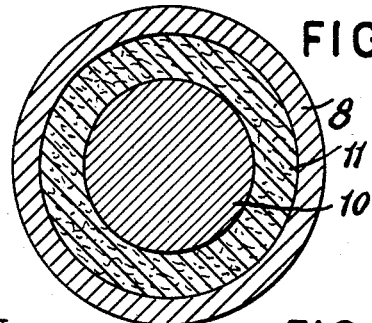
Fig. 2 is a section taken along the line II—II of Fig. 1.

Referring in greater detail to the drawings, the reference numeral 1 indicates the shell or faucet casing. The reference numeral 2 indicates a water pipe, and numeral 4 the rotatable valve stem which is provided with external threads 6 engaging an internally threaded valve housing (not shown) to permit the raising and lowering of the valve by rotative movement of a valve handle (not shown).

The valve seat member 14 preferably of stainless steel, is mounted on the valve shell 1 by means of the flange 7 of the shell which engages a corresponding groove in the member 14 and rests on the packing 15.

The valve head, generally indicated at 45, comprises a ring shaped member 8 which is mounted for free rotative movement about the piston 9, by means of the inwardly turned annular flange 24.

The bottom of the ring is preferably beveled to provide a ridge 21 for engaging the surface of the valve seat 14.

The packing 11 of semi-solid resilient material, such as neoprene, hard rubber or soft rubber and the like, is confined within the ring 8 between the piston and the beveled surface 25 of the ring.

The core 10 is recessed in the packing 11 and provided with an annular ridge 20 or edge for engaging the surface 27 of the valve seat member 14, and closing the conduit 2. Preferably the core is tapered so that it will be firmly seated within the packing during the raising and lowering of the valve head.

Preferably, a disc 12 is interposed between the packing 11 and the piston and may be made of stainless steel or similar material. The disc protects the packing from direct contact with the piston and also serves to distribute the pressure of the piston uniformly over the entire cross section of the packing.

The piston 19 is hung or suspended from the valve stem 4 by means of the foot 19 engaging a socket formed by the inwardly turned flange 18 of the piston.

The valve head may be assembled as follows:

The core 10 is forced into a recess in the resilient packing 11; then the packing with the core is inserted into the ring 8 in which it is retained by the beveled surface 25; the plate or washer 12 and the piston 9 are then in turn placed on top of the packing and the upper edge of the ring crimped to form the flange 24, about the piston.

The valve operates as follows:

The ridges 20 and 21 of the core 10 and the ring 8 respectively are brought into contact with the surface 27 of the valve seat member 14 by the closing movement of the valve stem 4. By continued slight movement of the stem the resilient packing is put under pressure. In view of the fact that the inner diameter of the annular ridge 21 is less than the diameter of the piston or, in other words, as the bottom edge of the ring 8 is beveled inwardly, the packing 11 under the stress of the piston will press the ring firmly against the surface 27 of the valve seat member 14. For the same reason, the ridge 20 of the core 10 is pressed against the surface 27.

By reason of the confinement of the packing between the ring 8 and the core 10, the downward stress on the packing will cause the semi-solid material to be pressed downward between the annular ring formed by beveled surface 25 and the core 10 by the extruding force of the valve closing operation. Hence, the semi-solid material is forced down against the flat surface 27 of the valve seat member 14 to effectively prevent any flow across the face of the seat. When the valve stem is turned to open position of the valve, the packing 11 first retreats to its initial unstressed position and then the faces 20, 21 and 27 disengage.

Since there is no wiping or twisting action on the semi-solid packing material at the contacting faces there will be no substantial wear or abrasion on the bottom of the annular ring of the packing. However, even if such abrasion should occur under extremely high pressure conditions the abraded rubber will be replaced by the advancement of the packing within the annular ring under the pressure exerted by the piston. Such abrasion may be avoided by making the ridges 20 and 21 of material having inferior wearing qualities to those of the packing, for instance brass, so that the ridges will wear faster than the packing.

The areas of the respective parts can be so apportioned that the stress on the packing will never exceed a predetermined maximum which will destroy the valve head.

Figure 3:
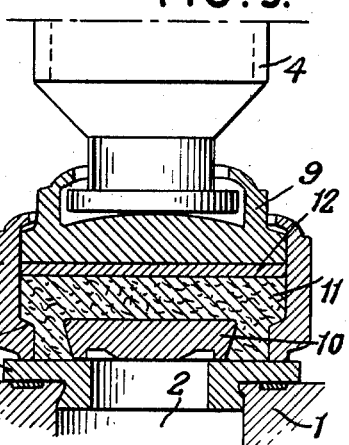
Fig. 3 is a view similar to Fig. 1 showing a slight modification of the anchoring of the packing.

In the embodiment shown in Fig. 3 the downward stress of the packing member 11 under pressure of the piston 9 is taken up by the annular shoulder 29 and thus the ring 8 with its contact ridge is forced downward into engagement with the valve seat member 14.

Figure 4:
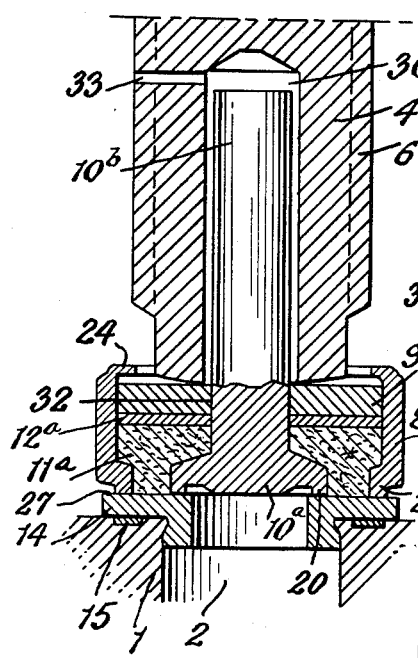
Fig. 4 is a view similar to Fig. 1 of another modification.

In the embodiment shown in Fig. 4 the core 10a is provided with a stem 10b which extends through the aperture 32 of the piston 9a into the well 32 of the valve stem 4 with a sufficiently loose fit to permit free rotative movement between the piston and the valve stem.

The plate 12a of tin, plastic or similar material may be interposed between the piston 9a and the packing 11a. The well 32 is provided with an air escape duct 33. The upper surface of the piston 9a abuts against the valve stem 4. Thus the closing operation of the valve stem will subject the packing 11a to a downward stress which is transmitted to the ring 8a and the core 10 to force these members into engagement with the surface 27 of the valve seat member 14 in the same manner as the operation of the embodiment shown in Fig. 1.

Figure 5:
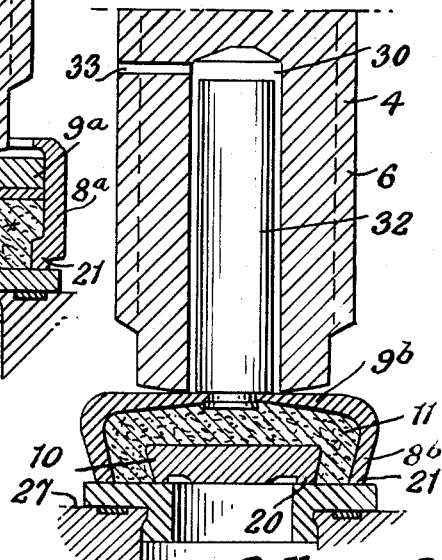
Fig. 5 is a similar view of still another modification.

On the embodiment shown in Fig. 5 the piston of the preceding figure has been replaced by the membrane 9b extending from the ring 8b. The stem 32 fits loosely in the well 30 which is provided with an air escape duct 33 similarly to Fig. 4. The membrane 96 abuts against the valve stem 4, and will flex under the force of the closing operation of the valve stem and the resultant downward stress on the packing will cause the rubber or similar material of the packing 11 to be forced downward between the annular ring formed by the edge 21 of the ring 8 and the edge 20 of the core 10.

It should be understood that the foregoing description is given by way of example and not by way of limitation. The inventive concept might be expressed in a variety of applications within the scope of the following claims:

What we claim is:

1. A valve head which is operable to move in opposite directions to open and close against a flat seat member annularly surrounding a port; said valve head comprising a ring shaped member having an annular edge for engaging said seat member, a core member within said ring shaped member spaced from the interior walls thereof to provide an intermediate annular space, said core member having a face for engaging said seat member jointly with said ring shaped member, a pressure member engaging the walls in said ring shaped member and adapted to move within said ring shaped member in response to the closing and opening movement of the valve head, a packing of resilient extrudable material between said pressure member and said core member means on said ring shaped member for restraining said packing against independent movement in the direction of the closing movement of the valve head whereby the extruding force on the packing produced by the closing movement of the valve will cause said ring shaped member and said core member to engage said seat member and to cause the packing to be forced against said seat member to seal the port.

2. A valve head according to claim 1 having a disc member between the packing and the pressure member for transmitting the pressure uniformly over the cross sectional area of the packing.

3. A valve head according to claim 1 in which the core member is recessed in the packing and carried thereby during the closing and opening movement.

4. A valve head according to claim 1 in which the packing and pressure members are apertured and the core is provided with a stem extending through said apertures.

5. A valve head according to claim 1 in which the pressure member is a flexible membrane forming part of the ring shaped member.

6. A valve head which is operable to move in opposite directions to open and close against a flat seat member annularly surrounding a port; said valve head comprising a ring-shaped member having an annular edge for engaging said seat member; a core member within said ring-shaped member spaced from the interior walls thereof to provide an intermediate annular space, said core member closing said port when the valve head is in the closed position, a pressure member engaging the walls in said ring-shaped member and adapted to move within said ring-shaped member in response to the closing and opening movement of the valve head, a packing of resilient extrudable material between said pressure member and said core member, means on said ring-shaped member for restraining said packing against independent movement in the direction of the closing movement of the valve head whereby the extruding force on the packing produced by the closing movement of the valve will cause said ring-shaped member to engage said seat member and to cause the packing to be forced against said seat member to seal the port, said core member including means preventing axial movement in said port in response to the extruding force on the packing.

References Cited in the file of this patent

UNITED STATES PATENTS

| 2,088,666 | Portl | Aug. 3, 1937 |
| 2,131,928 | Abegg | Oct. 4, 1938 |
| 2,792,016 | Shellman | May 14, 1957 |

FOREIGN PATENTS

| 488,482 | Canada | Dec. 2, 1952 |
| 78,362 | Norway | of 1954 |